United States Patent Office 2,860,146
Patented Nov. 11, 1958

2,860,146

MANUFACTURE OF EPIHALOHYDRINS

Kenneth E. Furman, Richmond, Harry de V. Finch, Berkeley, and George W. Hearne, Lafayette, Calif., assignors to Shell Development Company, New York, N. Y., a corporation of Delaware No Drawing. Application April 14, 1955
Serial No. 501,454

11 Claims. (Cl. 260—348.6)

This invention relates to the production of epoxy halides and more especially the manufacture of epihalohydrins. It deals with a process whereby epihalohydrins can be prepared efficiently and economically from acrolein by a novel combination of procedural steps.

Glycerol epichlorohydrin has long been known as a valuable intermediate in the manufacture of resins and other products. It is produced on a large scale from allyl chloride. This method of manufacture involves the consumption of two moles of chlorine per mole of product under ideal conditions, one mole being required for the production of the allyl chloride and the other for its chlorohydrination to dichlorohydrin which is then dehydrochlorinated to produce the desired epichlorohydrin. In actual practice more than two moles of chlorine are always required since theoretical quantitative yields are never attained. The present process makes it possible to produce epichlorohydrin with less than half the consumption of chlorine necessary in this previous method. It is a further advantage of the new process that valuable ketones are obtained as by-products which reduce the cost of the epichlorohydrin produced. Still other advantages and objects of the invention will be apparent as the invention is described hereinafter.

In accordance with the invention epichlorohydrin is produced from acrolein in three cooperating steps which comprise first reacting the acrolein with chlorine to form alpha,beta-dichloropropionaldehyde, reacting this product with a secondary alcohol to effect hydrogen transfer from the hydroxyl group of the alcohol to the carbonyl group of the dichloropropionaldehyde thus forming glycerol 1,2-dichlorohydrin and a ketone corresponding to the secondary alcohol used, and finally dehydrochlorinating the glycerol 1,2-dichlorohydrin by reaction with a base and recovering the epichlorohydrin,

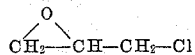

and the ketone produced. A special feature of the invention is the provision of a novel and particularly advantageous method for carrying out the reduction of the alpha,beta-dichloropropionaldehyde by hydrogen transfer from a secondary alcohol which method is useful for the production of dichlorohydrins whether used in connection with the new combination process of the invention or not.

The first step of the novel combination process, namely, chlorination of the acrolein, can be carried out in different ways. Liquid phase chlorination is especially advantageous but chlorination in the vapor phase can also be used. The chlorination can be successfully accomplished without the use of a solvent when anhydrous acrolein (less than 0.05% water) is used but since such complete removal of water is expensive liquid phase chlorination is usually more advantageously conducted with acrolein in solution in an organic solvent. Inert solvents, such, for example, as chlorinated hydrocarbons, for instance, carbon tetrachloride, chloroform, ethylene chloride, and the like, or fluorinated hydrocarbons such as perfluorohexane, perfluorocyclohexane, etc., are particularly suitable. However, there are advantages in using as solvent a liquid which does not add a new component in the overall process so does not involve an additional separation operation and separate storage facilities. It has been found, unexpectedly, that the ketone which is a by-product of the reduction step of the process can be successfully used as the solvent during chlorination. Even though these ketones are not inert solvents, by proper control of the proportion of ketone to acrolein, the chlorination can be made selective so that substantially only chlor addition to form 1,2-dichloropropionaldehyde takes place. Any small amounts of chloro-substituted ketone formed are not detrimental in the process.

The acrolein used should preferably be as free from water as possible in order to reduce formation of higher boiling by-products, especially if the chlorination is carried out with a solvent for the acrolein. The best results have been obtained with acrolein containing less than 0.05% water. Any solvent used in chlorination should preferably also be anhydrous.

One suitable method of carrying out the chlorination in the liquid phase is to feed the acrolein, preferably in solution in a solvent as previously indicated, into the top of a packed column down which it flows in counter-current to chlorine supplied at the bottom of the column. Other methods of contacting the chlorine and acrolein continuously or batchwise, under conditions favorable for chlor-addition with minimum chloro-substitution or other side reactions can, however, be employed. Iron equipment should be avoided in the process since it has been found that even small amounts of ferric chloride can cause excessive polymerization. Nickel is a satisfactory material for construction of the chlorination unit. The chlorination is preferably conducted at a temperature of about —20° C. to about 30° C., using a mole ratio of solvent to acrolein of about 0.05:1 to about 3:1 and between about 0.9 to about 1.1 moles of chlorine per mole of acrolein. Only short times of contact of the order of about 0.1 to about 60 seconds are necessary when intimate contact between the gaseous chlorine and liquid acrolein is provided. Chlorination is usually carried out at ordinary pressure but superatmospheric pressures can also be used.

Typical of the results obtainable in the chlorination step of the process are the following runs carried out at 5–20° C. with freeze-dried acrolein 98.5% pure and containing 0.1–0.2% water.

| Solvent | Moles Solvent per Mole Acrolein | Moles Chlorine per Mole Acrolein | Conversion of Acrolein, percent | Yield of α,β-Dichloropropionaldehyde Based on Acrolein Converted | High-Foiling Product as percent of Chlorine + Acrolein Charged |
|---|---|---|---|---|---|
| None | None | 0.95 | 98 | 88 | 10.7 |
| Methyl ethyl ketone | 2.3 | 0.97 | 96.6 | 87 | 7.3 |
| Carbon tetrachloride | 0.6 | 0.97 | 98.5 | 94.2 | 3.1 |

The product usually contains a small amount of chloride ion, presumably hydrogen chloride, which may be removed before feeding the product to the reduction step of the combination process with or without the higher boiling products also formed which can be removed by distilling off the 1,2-dichloropropionaldehyde at 20 millimeters mercury pressure, for example.

Ordinary methods of catalytic hydrogenation cannot be used successfully for the reduction step of the new process because of the poor yields and for high consumption of catalyst in the reaction. But efficient reduction of the 1,2-dichloropropionaldehyde can be carried out very economically by hydrogen transfer from a secondary alcohol in the presence of an aluminum alcoholate. Preferably lower, unsubstituted aliphatic secondary alcohol is employed for the reduction although secondary alcohols having a benzenoid or other aromatic ring in the molecule can also be used. Representative secondary alcohols which have been found to be useful as the reducing agent include, among others, secondary butyl alcohol, secondary amyl alcohol, diethyl carbinol, methyl isobutyl carbinol, 5-methyl-3-heptanol, diisobutyl carbinol, dodecanol-2, cyclohexanol, methyl cyclohexyl carbinol, phenyl methyl carbinol, and the like, and their homologs and analogs. The saturated alcohols having 4 to 12 carbon atoms per molecule are especially useful.

As a rule, it is preferred to carry out the reduction in the presence of the aluminum alcoholate corresponding to the secondary alcohol used as reducing agent since in this way separation and recovery of the reaction products are usually simplified. It is feasible, however, to use aluminum alcoholates derived from other secondary alcohols to catalyze the reaction. Preferred alcoholates are the aluminum alkoxides from secondary aliphatic alcohols having 3 to 10 carbon atoms per molecule. The alcoholate can be prepared in the known manner by dissolving metallic aluminum in the chosen secondary alcohol or mixture of such alcohols. One convenient method is to dissolve the aluminum in an excess of the secondary alcohol and employ the resulting solution of aluminum secondary alcoholate for the reduction. The alcoholate can be recovered and purified before use, however.

For good yields of glycerol 1,2-dichlorohydrin it is necessary to use solvent for the reactants during reduction in addition to the required amount of alcohol serving as hydrogen transfer agent. This solvent can be an excess of the secondary alcohol or mixture of alcohols being used as the reducing agent, for example, about 1 to about 20 moles of a liquid secondary alcohol of at least four carbon atoms per molecule for each mole of alpha,beta-dichloropropionaldehyde initially present. However, it has been found that the yield of glycerol 1,2-dichlorohydrin can be very substantially increased by carrying out the reduction in the presence of a non-alcoholic solvent for the reactants. This is unexpected since in the customary methods of reducing carbonyl compounds with aluminum alcoholates alcohols are considered the most satisfactory solvents and the alcohol from which the alcoholate is made is regarded as the most advantageous. In the special case of alpha,beta-dichloropropionaldehyde much better results are obtained by using a non-alcoholic solvent together with the secondary alcohol employed as hydrogen transfer agent. A large number of different types of suitable non-alcoholic solvents are available. Hydrocarbon solvents such, for instance, as benzene, toluene, pentane, hexane, iso-octane, gasoline or kerosene, or the like are satisfactory. But even better yields can be obtained with halogenated hydrocarbons as the solvent, those which have been described above as suitable in the chlorination step being useful solvents also in the reduction step of the process.

Ketones are another especially useful class of solvents for the reactants in the reduction step of the process. This is quite unexpected since ketones are formed in the reaction and their use as solvents might have been expected to have an adverse mass action effect on the reduction. However, it has been found that in reducing 1,2-dichloropropionaldehyde by reaction with a secondary alcohol in the presence of an aluminum alcoholate, the equilibrium constant is such that complete reduction can be readily obtained when using as solvent large amounts of the ketone which is formed in the reaction. Preferred ketone solvents are the saturated aliphatic liquid ketones of 4 to 12 carbon atoms per molecule, examples of which are methyl ethyl ketone, diethyl ketone, methyl propyl ketone, methyl isopropyl ketone, methyl isobutyl ketone, 5-methyl-3-heptanone, diisobutyl ketone, dodecanone-2, cyclohexanone, methyl cyclohexyl ketone, and the like, but unsaturated ketones such as methyl allyl ketone, mesityl oxide, phenyl methyl ketone, etc., can also be used successfully as the solvents. The most advantageous ketone solvent to use in a particular case is the ketone which corresponds to the alcohol employed as reducing agent. As previously indicated, we generally prefer to use the same solvent for the reduction step as is used in the chlorination step, most preferably a halogenated hydrocarbon or a ketone. The solvent or solvents can be recovered from the product after one or both of these reaction steps or from the final product and recycled to the reaction steps as required. The following are typical of the results which can be obtained using dichloropropionaldehyde produced as shown in the previous table with secondary butyl alcohol and aluminum secondary butoxide in a molar feed ratio of 1:1.3:0.2.

| Solvent | Mole: Solvent/ DCP | Percent Yield ᵃ Dichlorohydrin |
|---|---|---|
| None | | 65 |
| Secondary butyl alcohol | ᵇ 3.5 | 74.2 |
| Do | ᵇ 9.8 | 81.4 |
| Toluene | 4.7 | 89.5 |
| CCl₄ | 4.96 | 92.5 |
| Methyl ethyl ketone | 5.24 | 92.2 |

ᵃ 100% conversion, yields based on analyzed product.
ᵇ Includes secondary butyl alcohol in feed ratio.

As little as 0.075 mole of aluminum alcoholate per mole of dichloropropionaldehyde (DCP) gives satisfactory reduction but better yields of glycerol dichlorohydrin (DCH) are obtained with larger amounts as shown by the following comparative tests and we preferably use molar ratios of about 0.10:1 to about 0.50:1, most advantageously ratios of 0.15:1 to 0.25:1.

| Mole: CCl₄/ DCP | Mole: Al/ DCP | Percent Yield DCH |
|---|---|---|
| 4 | 0.05 | 46 |
| 7.9 | 0.10 | 81.1 |
| 4.96 | 0.20 | 90.5 |

These results are for a three hour reaction period in refluxing carbon tetrachloride solvent at 79° C. with a 100% conversion.

The temperature at which the reduction is carried out does not appear to be critical in the range of about 15° to about 150° C. However higher or lower temperatures can be used. When using ketones or secondary alcohols as solvents better yields are obtained at temperatures of about 30° to about 60° C. while with halogenated hydrocarbons or hydrocarbons as solvents the best results are generally realized at temperatures of about 50° to about 120° C., as shown by the following representative runs made with secondary butyl alcohol as the hydrogen donor in a mole ratio of 1.3:1 to the dichloropropionaldehyde:

| Solvent | Temperature, °C. | Percent Yield of DCH |
|---|---|---|
| CCl₄ | 79 | 92.5 |
| CCl₄ | 53 | 90.4 |
| Secondary butyl alcohol | 100-128 | 75.5 |
| Do | 50 | 81.4 |
| Methyl ethyl ketone | 85 | 87.4 |
| Do | 50 | 92.2 |
| Toluene | 107-117 | 89.5 |

A reaction time of about 1 to 8 hours is usually sufficient at these reaction temperatures.

Different procedures can be employed in carrying out the reduction. For instance, aluminum can be dissolved in the volume of secondary alcohol which corresponds to the chosen amounts of hydrogen transfer agent and aluminum alcoholate to be used. The alpha,beta-dichloropropionaldehyde dissolved in the chosen solvent is then mixed with the aluminum alcoholate solution and the mixture is held at reaction temperature for the required period. The ketone produced in the reaction can be distilled off as it is formed or it can be allowed to accumulate in the reaction mixture. Atmospheric or reduced or superatmospheric pressures can be used for the reduction which can be carried out batchwise, intermittently or continuously. On completion of the reaction the aluminum alcoholate can be removed and the product recovered by distillation or fed to the third reaction stage of the process. One method of removing the aluminum alcoholate is by decomposition which can be effected with water with or without an acid such as sulfuric, phosphoric, hydrochloric or like acids. Preferably about 3 to 20 moles of water per mole of aluminum alcoholate are used to effect the decomposition with not more than about 98% of the theoretical requirement of acid for reaction to form the aluminum salt.

The final step in the combination process, namely dehydrochlorination of the glycerol 1,2-dichlorohydrin to epichlorohydrin, is carried out by reaction with a basic agent, preferably an alkali metal or alkaline earth metal oxide or hydroxide, or carbonate or bicarbonate. Sodium hydroxide or lime are cheap and effective but sodium carbonate, sodium bicarbonate, potassium carbonate, potassium hydroxide, magnesium hydroxide, barium hydroxide, or the like can likewise be used. It has been found that an excess of basic agent over the theoretical requirement for the reaction should be used in order to obtain the highest yield of epichlorohydrin. Preferably about 110 to about 140% of the theoretical amount of base is used for the dehydrochlorination in the absence of aluminum hydroxide. Where aluminum hydroxide is present from the aluminum alcoholate used in the preceding step of the process, it is necessary to add extra base in an amount at least molecularly equivalent to the aluminum hydroxide present in order to obtain the highest yield. The dehydrochlorination can be carried out at temperatures of about 50° to about 200° C. using atmospheric or superatmospheric pressures, and a reaction time of about 1 to 30 minutes, the shorter time being used at the higher temperature and vice versa. The following results obtained with glycerol 1,2-dichlorohydrin, which has been produced by reducing alpha,beta-dichloropropionaldehyde with aluminum secondary butoxide as previously described, show the effect of aluminum hydroxide formed during decomposition of the butoxide by water on the dehydrochlorination and how it can be overcome when using lime as the dehydrochlorinating agent. In one test the aluminum hydroxide was separated by distilling off the glycerol 1,2-dichlorohydrin. In the other tests the aluminum hydroxide was not removed and the dichlorohydrin was reacted in one case with the same amount of lime as had given good results in the absence of aluminum hydroxide and in the other case with additional lime equivalent to the aluminum hydroxide present.

| Amount of Aluminum Hydroxide (moles per mole of dichlorohydrin) | None | 0.20 | 0.22 |
|---|---|---|---|
| Moles of CaO used per mole of dichlorohydrin | 0.678 | 0.678 | 1.04 |
| Yield of Epoxide at a Reaction Time of: | | | |
| 1 minute _____ percent | 70 | 56 | 64 |
| 3 minutes _____ do | 90 | 77 | 83 |
| 5 minutes _____ do | 95 | 79 | 94 |
| 10 minutes _____ do | 98 | 78 | 95 |
| 15 minutes _____ do | 95 | 81 | 96 |
| 30 minutes _____ do | 85 | 83 | 85 |
| 60 minutes _____ do | 70 | 80 | 77 |
| 90 minutes _____ do | 55 | 71 | 75 |

The dehydrochlorination of the glycerol dichlorohydrin can be carried out in the presence of the ketone or secondary alcohol solvent used in its preparation without interference with the reaction. Solvents which are reactive with the base used for the dehydrochlorination, for instance halogenated hydrocarbon solvents, are preferably removed before carrying out this reaction. The reaction is advantageously conducted at a temperature in the range of about 70 to about 100° C., a reaction time of the order of about 5 to 25 minutes being usually sufficient. The epichlorohydrin produced can be efficiently recovered by steam distillation of the reacted mixture or in any other suitable manner.

The following examples further illustrate the combination process of the invention:

Example I

Acrolein was dehydrated by cooling to about —75° C., filtering out the ice formed rapidly under vacuum. The dried acrolein of less than 0.2% water content was chlorinated in the liquid phase by batch reaction in a glass reactor. The acrolein was dissolved in 0.6 mole of carbon tetrachloride per mole of acrolein and 0.97 mole of chlorine per mole of acrolein was passed into the solution at slightly less than 20° C. A 98.5% conversion of acrolein and a 94.2% yield of distilled alpha,-beta-dichloropropionaldehyde was obtained. The alpha,-beta-dichloropropionaldehyde fraction with added carbon tetrachloride to give a mole ratio of $CCl_4$ solvent to dichloropropionaldehyde of about 5:1 was mixed with a solution of aluminum secondary butoxide in secondary butyl alcohol containing 0.15 mole of aluminum per mole of secondary butyl alcohol in the proportions of 1.33 moles of secondary butyl alcohol per mole of dichloropropionaldehyde. The mixture was heated on an oil bath for 7 hours at 79° C. About 85% of the stoichiometric amount of sulfuric acid required to decompose the aluminum alcoholate was added to the reacted mixture as a 22% solution in water. The product was distilled through a packed column at a 5:1 reflux ratio to a kettle temperature of 104–110° C. at atmospheric pressure and then under 20 mm. pressure to obtain a product cut boiling at 60°–85° C. Analysis of this fraction gave a hydroxyl value of 0.731 equivalents per 100 grams and 54.4% chlorine. The conversion of dichloropropionaldehyde was quantitative and the yield of glycerol 1,2-dichlorohydrin was 92.5% on the dichloropropionaldehyde used or 87.1% on the acrolein converted.

The glycerol 1,2-dichlorohydrin was mixed with 135% of the theoretical amount of lime required for dehydrochlorination to glycerol epichlorohydrin, and the mixture was heated for 15 minutes at 80° C. A 95.5% yield of epoxide based on dichlorohydrin or 83.1% yield on acrolein converted was obtained.

Example II

Acrolein was dried and chlorinated at 10°–20° C. as in Example I using 0.605 mole of carbon tetrachloride and 0.972 mole of chlorine per mole of acrolein. The entire reaction mixture then was mixed with additional carbon tetrachloride to make the total 4.93 moles per mole of starting acrolein and a solution of 0.154 mole of aluminum per mole of secondary butyl alcohol was added in the proportion of 1.25 moles of secondary butyl alcohol per mole of starting acrolein. The mixture was heated at 79°–88° C. for 5 hours. The yield of glycerol 1,2-dichlorohydrin obtained by distillation after destroying the aluminum alcoholate with a ten-fold molar excess of water was 89.2% based on the amount of chlorine charged.

The crude dichlorohydrin product was diluted with water and steam distilled to a head temperature of 80–81° C. to remove the solvent. The resulting homogenous solution containing suspended aluminum hydroxide was mixed with 200% of the theoretical amount of lime required for dehydrochlorination to epichlorohydrin, thus providing an excess of lime for dehydrochlorination after allowing an equivalent amount of lime for combination with the aluminum hydroxide present. The mixture was heated for 15 minutes at 80° C. and a 96% yield of epichlorohydrin based on the dichlorohydrin used was obtained.

Example III

Acrolein was dried as in Example I and dissolved in methyl ethyl ketone using 2.3 moles of solvent per mole of acrolein and 0.966 mole of chlorine per mole of acrolein was passed into the mixture at 10°–20° C. to obtain a 96.6% conversion of acrolein to alpha,beta-dichloropropionaldehyde in 94% yield. The distilled product with added methyl ethyl ketone in a mole ratio of 5:1 was mixed with a solution of aluminum secondary butoxide in secondary butyl alcohol in the proportion of 0.154 mole of aluminum per mole of alcohol so as to form a mixture containing 1.29 moles of secondary butyl alcohol per mole of dichloropropionaldehyde. The mixture was heated at 50° C. for 3 hours and the aluminum alcoholate then converted to aluminum hydroxide by treatment with water. The entire reaction mixture was then treated with 0.982 mole of calcium oxide per mole of dichloropropionaldehyde applied, this being sufficient to provide 135% of the theoretical requirement for reaction with the dichlorohydrin over and above the lime for combination with the aluminum hydroxide. The mixture at pH about 12 was then heated at 80° C. for 10 minutes and the epichlorohydrin recovered in 89.8% yield of epoxide based on the dichloropropionaldehyde applied or an 84% yield from the acrolein converted.

We claim as our invention:

1. A process for producing epichlorohydrin which comprises contacting acrolein with chlorine in a mole ratio of about 0.9:1 to about 1.1:1 at about —20° C, to about 30° C. whereby addition of the chlorine to the double bond with formation of alpha,beta-dichloropropionaldehyde takes place, reacting the alpha,beta-dichloropropionaldehye with a secondary alcohol containing from 4 to 12 carbon atoms and of the class consisting of the secondary unsubstituted alkanols and unsubstituted cycloalkanols and an aluminum alcoholate of a secondary alcohol containing from 4 to 12 carbon atoms and of the class consisting of the secondary unsubstituted alkanols and cycloalkanols, to effect transfer of hydrogen from said alcohol to said dichloropropionaldehyde and form glycerol 1,2-dichlorohydrin together with the ketone corresponding to said alcohol reactant, and dehydrochlorinating the glycerol 1,2-dichlorohydrin by reaction with at least 10% excess of a base of the class consisting of the oxides, hydroxides, carbonates and bicarbonates of alkali metals and of alkaline earth metals to form epichlorohydrin.

2. A process for producing epichlorohydrin which comprises contacting a solution of acrolein in carbon tetrachloride as solvent with chlorine in a mole ratio of about 0.9:1 to about 1.1:1 at about —20° C. to about 30° C. whereby addition of the chlorine to the double bond with formation of alpha,beta-dichloropropionaldehyde takes place, reacting a solution of the alpha,beta-dichloropropionaldehyde in said solvent with a secondary unsubstituted alkanol containing from 4 to 12 carbon atoms and an aluminum alcoholate of a secondary unsubstituted alkanol containing from 4 to 12 carbon atoms to effect transfer of hydrogen from said alkanol to said dichloropropionaldehyde and form glycerol 1,2-dichlorohydrin together with the alkanone corresponding to said alkanol, removing the solvent from the dichlorohydrin product, returning at least a part of the solvent to the chlorination reaction, and dehydrochlorinating the glycerol 1,2-dichlorohydrin product by reaction with at least 10% excess of a base of the class consisting of the oxides, hydroxides, carbonate and bicarbonates of alkali metals and of alkaline earth metals to form epichlorohydrin.

3. A process for producing epichlorohydrin which comprises contacting a solution of acrolein in an unsubstituted alkanone of from 4 to 12 carbon atoms as solvent with chlorine in a mole ratio of about 0.9:1 to about 1.1:1 at about —20° C. to about 30° C. whereby addition of the chlorine to the double bond with formation of alpha,beta-dichloropropionaldehyde takes place, reacting a solution of the alpha,beta-dichloropropionaldehyde in said alkanone with a secondary unsubstituted alkanol of from 4 to 12 carbon atoms and from 0.075 to about 0.5 mole per mole of said dichloropropionaldehyde of an aluminum alcoholate of a secondary unsubstituted alkanol of from 4 to 12 carbon atoms, to effect transfer of hydrogen from said alkanol to said dichloropropionaldehyde and form glycerol 1,2-dichlorohydrin together with an alkanone corresponding to said alkanol, and dehydrochlorinating the glycerol 1,2-dichlorohydrin by reaction with at least 10% excess of a base of the class consisting of the oxides, hydroxides, carbonates and bicarbonates of alkali metals and of alkaline earth metals to form epichlorohydrin.

4. A process in accordance with claim 3 wherein the alkanone is methyl ethyl ketone, the secondary alkanol is secondary butyl alcohol and the aluminum alcoholate is aluminum secondary butoxide.

5. In a process for producing epichlorohydrin, the steps comprising reacting alpha,beta-dichloropropionaldehyde with a secondary alcohol containing from 4 to 12 carbon atoms and of the class consisting of the secondary unsubstituted alkanols and unsubstituted cycloalkanols and from 0.075 to about 0.5 mole per mole of said dichloropropionaldehyde, of an aluminum alcoholate of a secondary alcohol containing from 4 to 12 carbon atoms and of the class consisting of the secondary unsubstituted alkanols and unsubstituted cycloalkanols to effect transfer of hydrogen from said alcohol to said dichloropropionaldehyde and form glycerol 1,2-dichlorohydrin together with the ketone corresponding to said alcohol, treating the reacted mixture with water to decompose aluminum alcoholate present therein and form aluminum hydroxide, and dehydrochlorinating the glycerol 1,2-dichlorohydrin to form epichlorohydrin by reaction with an amount of a base of the class consisting of the oxides, hydroxides, carbonates and bicarbonates of alkali metals and of alkaline earth metals sufficient to provide at least 120% of the theoretical requirement for the dehydrochlorination in addition to an amount of said base stoichiometrically equivalent to the aluminum hydroxide present.

6. A process for producing epichlorohydrin which comprises reacting a mixture of alpha,beta-dichloropropionaldehyde dissolved in about 1 to about 20 moles per mole of said aldehyde of a solvent from the class consisting of unsubstituted alkanones and unsubstituted cycloalkanones of from 4 to 12 carbon atoms, carbon tetrachloride, chloroform, ethylene chloride, perfluorohexane and perfluorocyclohexane, with between 1 and 2 moles per mole of said aldehyde of a secondary alcohol containing from 4 to 12 carbon atoms and of the class consisting of the secondary unsubstituted alkanols and unsubstituted cycloalkanols and about 0.1 to about 0.5 mole of an aluminum alcoholate of a secondary alcohol containing from 4 to 12 carbon atoms of the class consisting of the secondary unsubstituted alkanols and unsubstituted cycloalkanols to effect transfer of hydrogen from said alcohol to said dichloropropionaldehyde and form glycerol 1,2-dichlorohydrin together with ketone corresponding to said alcohol reactant, decomposing the aluminum alcoholate in the reacted mixture to form aluminum hydroxide and dehydrochlorinating the glycerol 1,2-dichlorohydrin by reaction with a basic compound of the class consisting of the oxides, hydroxide, carbonates and bicarbonates of alkali metals and of alkaline earth metals present in an amount stoichiometrically equivalent to the aluminum hydroxide present plus at least 135% of the theoretical requirement for the conversion of the glycerol 1,2-dichlorohydrin to epichlorohydrin.

7. A process in accordance with claim 6 wherein the solvent is carbon tetrachloride.

8. In a process for producing epichlorohydrin by reducing alpha,beta-dichloropropionaldehyde to glycerol 1,2-dichlorohydrin and dehydrochlorinating the glycerol 1,2-dichlorohydrin, the improvement which comprises carrying out the reduction with a mixture of glycerol 1,2-dichlorohydrin, carbon tetrachloride as solvent therefor, and a secondary alcohol of from 4 to 12 carbon atoms of the group consisting of secondary unsubstituted alkanols and unsubstituted cycloalkanols, in the proportions of about 2 to about 10 moles of said solvent and between 1 and about 2 moles of said alcohol per mole of said aldehyde present together with about 0.1 to about 0.25 mole per mole of said aldehyde of an aluminum alcoholate of a secondary alcohol of from 4 to 12 carbon atoms of the group consisting of secondary unsubstituted alkanols and unsubstituted cycloalkanols.

9. A process for producing glycerol dichlorohydrin which comprises reacting a mixture of alpha,beta-dichloropropionaldehyde, an unsubstituted alkanone of from 4 to 12 carbon atmos as solvent for said aldehyde and a secondary alcohol of from 4 to 12 carbon atoms of the group consisting of unsubstituted alkanols and unsubstituted cycloalkanols, in the proportions of about 1 to about 20 moles of said alkanone and between 1 and about 2 moles of said alcohol with about 0.1 to 0.25 mole of an aluminum alcoholate of a secondary alcohol of from 4 to 12 carbon atoms of the group consisting of unsubstituted alkanols and unsubstituted cycloalkanols per mole of said aldehyde present.

10. A process in accordance with claim 9 wherein alkanone formed in the reduction is recycled to the reaction to serve as the solvent.

11. A process in accordance with claim 9 wherein the alkanone solvent is methyl ethyl ketone, the alcohol is secondary butyl alcohol and the aluminum alcoholate is aluminum secondary butoxide.

References Cited in the file of this patent

UNITED STATES PATENTS

| | | |
|---|---|---|
| 2,177,419 | Engs | Oct. 24, 1939 |
| 2,227,948 | Stein | Jan. 7, 1941 |
| 2,248,635 | Marple | July 8, 1941 |
| 2,779,801 | Finch | Jan. 29, 1957 |

FOREIGN PATENTS

| | | |
|---|---|---|
| 881,502 | Germany | June 29, 1953 |
| 601,211 | Great Britain | Apr. 30, 1948 |

OTHER REFERENCES

Munder et al.: Beilstein 17:6 (1933) (Zeitschrift für Chemie, 1871:252).

MacArdle: "Use of Solvents," pages 4, 129–135 (1925).

Young et al.: J. A. C. S., 58: 100–102 (1936).

Wilds: "Organic Reactions," vol. II, chapter #5 (pp. 179–223).

Ser. No. 376,926, Wagner (A. P. C.), published July 13, 1943.